United States Patent [19]

Cole

[11] 4,318,516
[45] Mar. 9, 1982

[54] ATTACHMENT OF MASSES TO AIRCRAFT AND SPACECRAFT

[75] Inventor: Ronald A. Cole, Barnet, England

[73] Assignee: Greenmeadow Engineers Limited, Barnet, England

[21] Appl. No.: 43,823

[22] Filed: May 30, 1979

[30] Foreign Application Priority Data

May 30, 1978 [GB] United Kingdom ............... 24376/78

[51] Int. Cl.$^3$ .................... B64D 27/00; B64D 27/18
[52] U.S. Cl. ........................................ 244/54; 244/55; 248/554
[58] Field of Search ................. 244/13, 15, 16, 34, 244/35, 37, 45 R, 54, 55, 56, 91, 93, 105, 123, 130, 135 R, 137 R; 248/554, 557

[56] References Cited

U.S. PATENT DOCUMENTS

| | | | |
|---|---|---|---|
| 1,893,001 | 1/1933 | Rohrbach | 244/55 |
| 2,514,888 | 7/1950 | McFarland | 244/123 |
| 2,563,263 | 8/1951 | Nicholl | 244/105 |
| 3,031,157 | 4/1962 | Varden | 244/54 |
| 3,149,800 | 9/1964 | Sintes et al. | 244/135 R |
| 3,831,888 | 8/1974 | Baker et al. | 244/54 |
| 3,844,115 | 10/1974 | Freid | 244/54 |
| 4,136,845 | 1/1979 | Eickmann | 244/55 |

FOREIGN PATENT DOCUMENTS

| | | | |
|---|---|---|---|
| 507681 | 6/1939 | United Kingdom | 244/54 |
| 843359 | 8/1960 | United Kingdom | 244/54 |
| 843655 | 8/1960 | United Kingdom | 244/54 |

OTHER PUBLICATIONS

Stambler, Irwin, "Supersonic Transport", G.P. Putnam's Sons (New York) 1965, pp. 14, 15, 16, 17, 20 and 21.

Primary Examiner—Galen L. Barefoot
Attorney, Agent, or Firm—William R. Hinds

[57] ABSTRACT

A wing of an aircraft has a mass, for example an engine, secured to the wing by a pylon such that an imaginary line between the center of gravity of the mass and the region of the wing to which the pylon is attached is at an angle to the vertical, the force and the moment applied to the wing by the mass and the pylon being applied to the wing through at least one attachment member. The force and the moment can be applied to the wing through first and second attachment members respectively.

13 Claims, 4 Drawing Figures

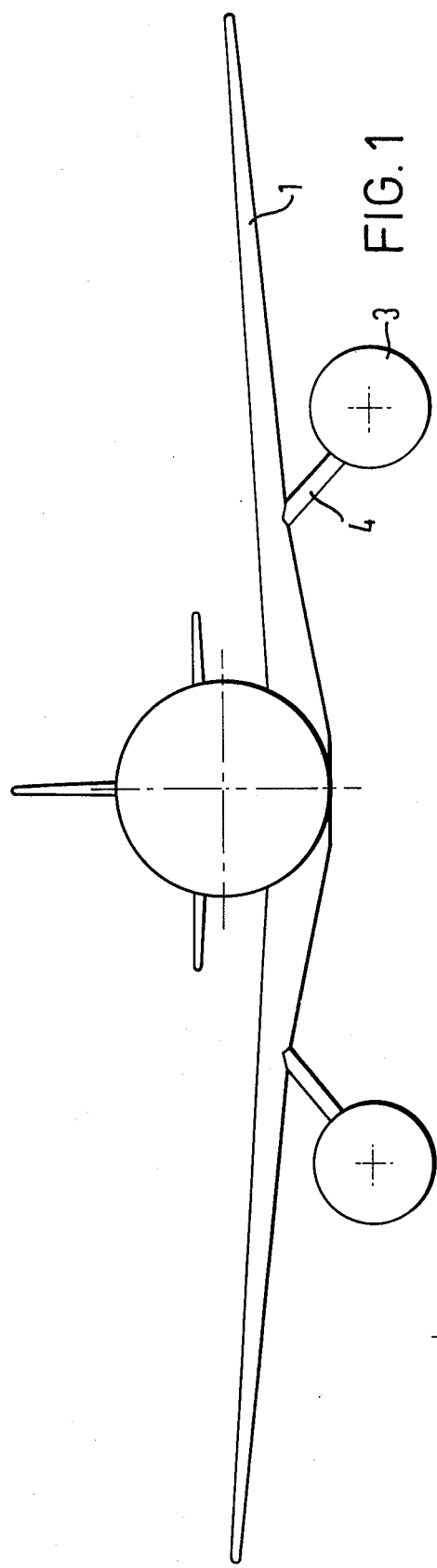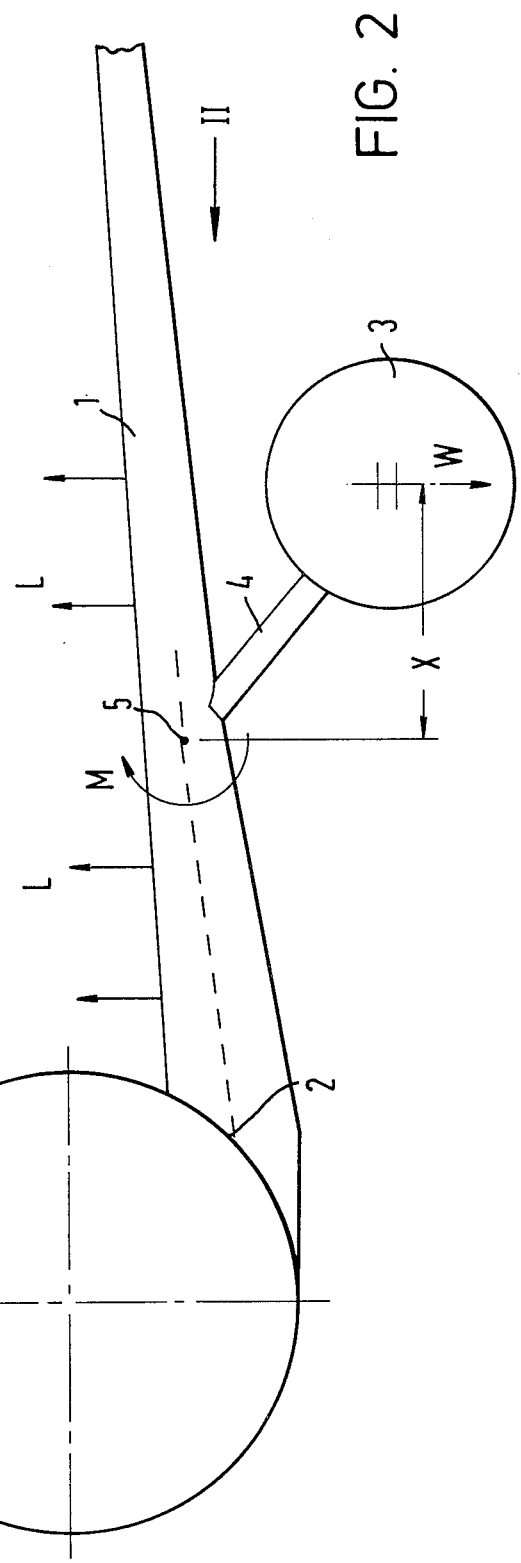

ATTACHMENT OF MASSES TO AIRCRAFT AND SPACECRAFT

FIELD OF THE INVENTION

This invention relates to aircraft, and spacecraft which are intended to fly in the earth's atmosphere, and more particularly but not exclusively, relates to fixing masses to the wings of such aircraft and spacecraft by means of pylons.

BACKGROUND OF THE INVENTION

It is desirable for most aircraft to have as large a span and aspect ratio as possible in order to reduce the drag of the aircraft. Increasing the span is however disadvantageous with regard to stresses in the wings as most of the mass of an aircraft is normally concentrated in the fuselage. It is known to mount the engines on the wings of an aircraft which helps to reduce the stresses in the wing and in particular the bending moment distribution along the wing. Known arrangements of this type have the engines suspended vertically from the point of attachment of their pylons.

SUMMARY OF THE PRESENT INVENTION

According to the present invention, there is provided, in an aircraft or spacecraft, the improvement which comprises the combination of a wing, a pylon, and a mass secured to the wing by the pylon in a manner such that an imaginary line between the center of gravity of the mass and the region of the wing to which the pylon is attached is at an angle to a vertical plane extending longitudinally of the aircraft or spacecraft when the aircraft or spacecraft is in straight, horizontal flight, so that the mass and the pylon apply a force and a moment to the wing, wherein the moment is applied to the wing so as to alleviate a moment in the wing produced by lift on the wing, and wherein the force and the moment are applied to the wing through two or more attachment members, with at least one attachment member applying only one of the force and the moment.

In another embodiment of the present invention the pylon is L-shaped, one side of the L-shaped pylon being located within the wing and being connected at its free end to the wing by said first and second attachment members, and the other side of the L-shaped pylon being substantially orthogonal to the wing, and the mass being secured to the free end of said other side of the L-shaped pylon.

It is expected that the present invention will be of particular use for when fitting an existing aircraft with new engines. In such a case the actual attachment points for pylons will have been designed and built into the wings of the aircraft. Also, the new engines may have a different weight to that of the old engines. The present invention enables the positions of the engines to be moved, relative to the positions of the original engines, so as to improve the moment distribution in the wing.

BRIEF DESCRIPTION OF THE DRAWINGS

In the drawings: FIG. 1 shows a view, parallel to the axis of the fuselage of an aircraft and looking aft, of an aircraft according to the present invention having, each wing having two spars.

FIG. 2 shows a similar view, to FIG. 1 of one wing of the aircraft of FIG. 1.

DETAILED DESCRIPTION OF THE EMBODIMENTS

Figure 3:
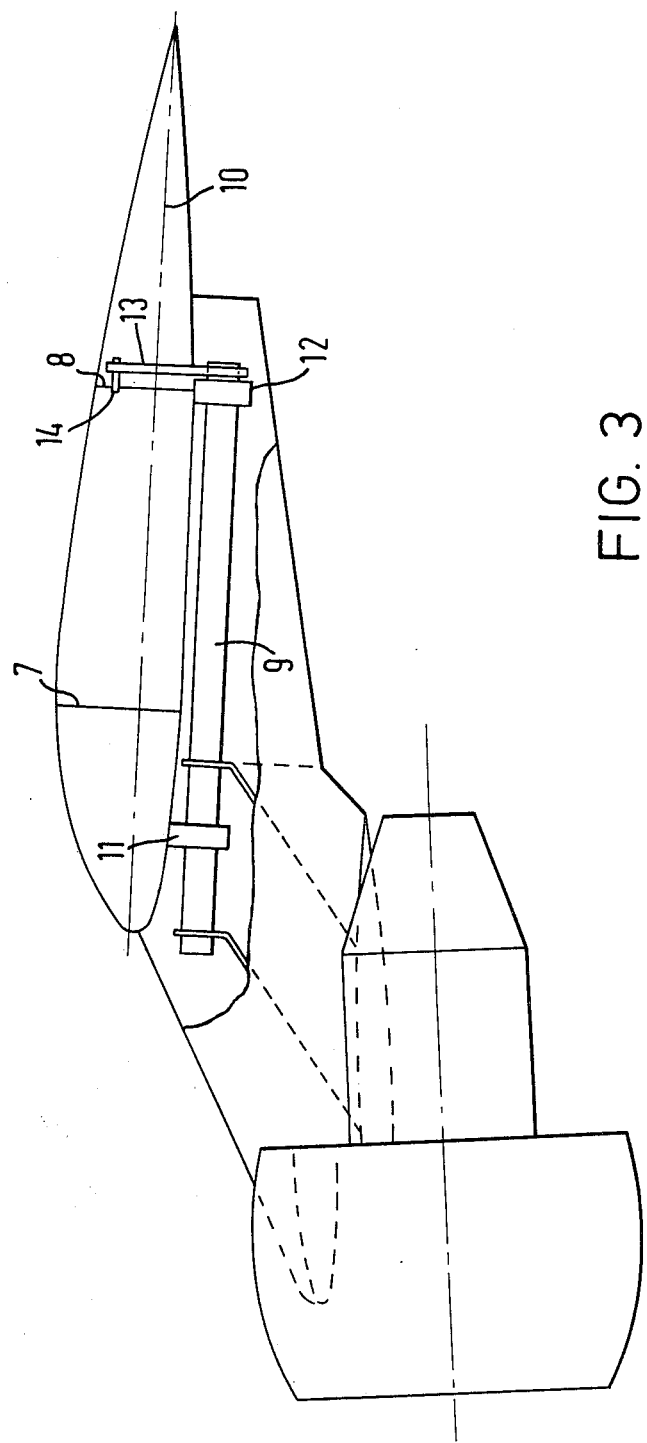
FIG. 3 shows a view in the direction of the arrow II of FIG. 2 with the wing and part of the pylon shown in section.

FIGS. 1 and 2 shows a wing 1 of an aircraft which wing, during straight horizontal flight of the aircraft is subject to a lifting force L, which is distributed over the wing. This lifting force L produces an anticlockwise bending moment (as viewed in FIGS. 1 and 2 which increases from the wing tip to the root 2 of the wing. An engine 3 is mounted on a pylon 4. The pylon 4 is at an angle to the vertical so that the centre of gravity of the engine 3 is a horizontal distance X away from the effective line of attachment 5 of the pylon 4 to the wing 1. Consequently there is both a vertically downwards force W (the weight of the engine 3) and a moment M equal to the product of the weight W and distance X, applied to the wing at the effective line of attachment 5. The moment M is a clockwise moment, and hence alleviates the stresses in the wing, inboard of the effective line of attachment 5, due to the distributed lifting force L, as the moment M is of opposite sign to the moment applied to the wing by the lifting force L.

Alternatively, an equivalent overwing configuration (not shown) which will cause the same force W and moment M to be applied to the point 5 as the underwing configuration, can be used.

FIG. 3 shows the means by which the pylon 4 is attached to a two spar wing 1. The wing in this embodiment comprises a two spar wing 1 having a front spar 7 and a rear spar 8. The pylon 4 includes a tube 9 which is rotatably mounted, parallel to the chord 10, in bearings 11 and 12 of the wing 1. The bearings 11 and 12 constitute first attachment members, and the downward force W is transmitted to the wing through these members. The tube 9 is free to move axially in the bearing 11, whilst the bearing 12 is attached to the rear spar 8 and forms part of a second attachment member for applying the torque M to the wing 1, as is discribed below. A lever 13 is secured to the rear end of the tube 9 and is attached to the rear spar 8 by a pin 14. The lever 13 and the pin 14 is conjunction with the rear bearing 12 comprise second attachment members, through which the moment M is applied to the spar 8 of the wing 1. As the moment M is of opposite sign to the moment due to the lift force L the stresses in the rear spar 8, inboard of the effective line of attachment will be reduced or alleviated. The tube 9 may also be positioned or secured so as to help distribute loads due, for example, to weight, drag and inertia. Thus, the tube 2 can form a general structural member rather than just a specialised member for transferring loads from the engine and pylon. Although the tube 9 is shown in FIG. 3 located outside the main wing envelope, it could be contined wholly or partly within the wing envelope.

Figure 4:
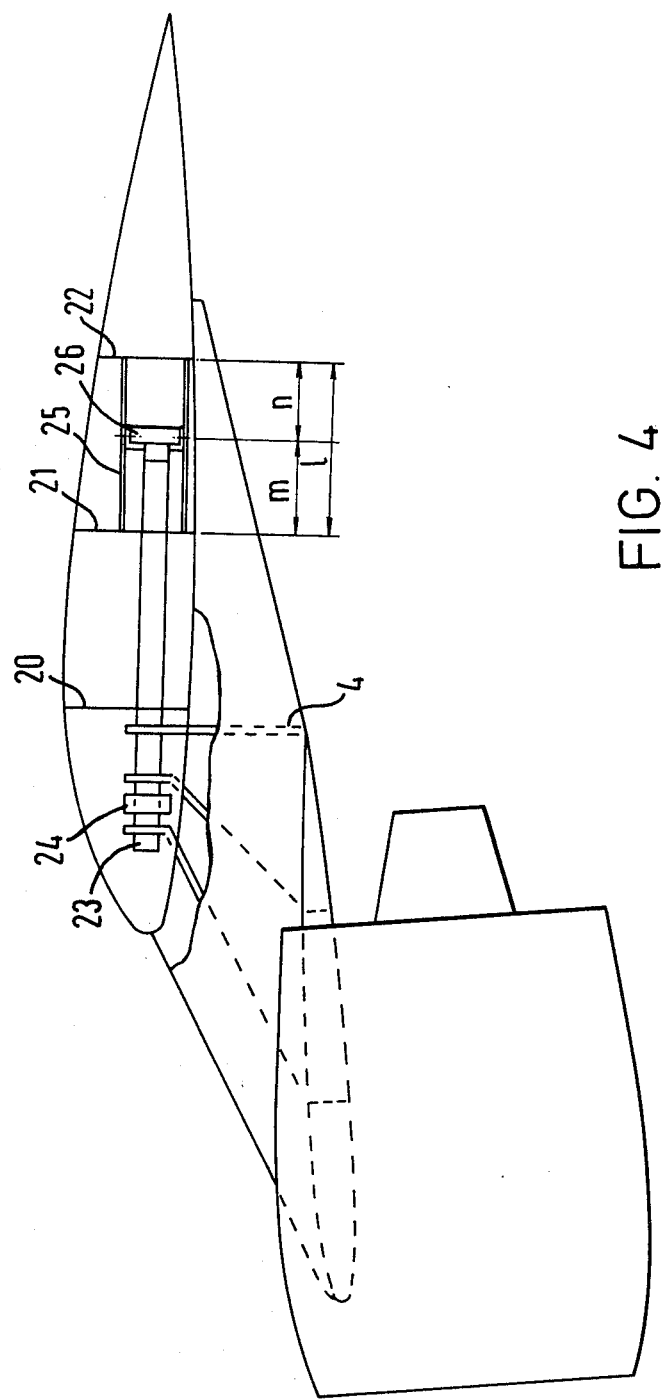
FIG. 4 shows a view, similar to that of FIG. 3, of a three spar wing, with the wing and part of the pylon shown in section.

FIG. 4 shows a three spar wing 1, which includes a front spar 20, a middle spar 21 and a rear spar 22. The pylon 4 includes a tube 23 located inside the wing. The tube 23 is supported in a bearing 24. The rear end of the tube 23 is located coaxially inside a second tube 25 of larger diameter and is secured to this tube by a flanged member 26. The ends of the second tube 25 are secured to the middle spar 21 and rear spar 22. Thus the second tube 25 and flanged member 26 comprise both first and second attachment members which apply both a force and the moment M to the middle and rear spars 21 and 22. One or both of the attachments between the ends of the tube 25 and the spars 21 and 22 incorporates a sliding device which allows the end of the tube 25 to slide axial with respect to the spar 21 or 22 to which it is connected. This enables the tube 25 to contract when under a torsional load, and consequently, prevents unwanted lateral loads being applied to the spars 21 and 22. The forward end of the tube is permitted a small amount of axial movement relative to the bearing 24. The proportion of the moment M, which is transferred to each of the spars 21 and 22, will depend on the ratio m ; n where m and n are the distances between the plane in which the moment is applied to the second tube 25, and the two spars 21 and 22.

It is preferable if the angle of the pylon to the vertical is greater than 30°.

Although the described embodiments have one or two tubes, a multiplicity of tubes can be used. The tubes need not necessarily have a common axis and could be interconnected by means of gears or other mechanical linkages. Additionally, an aircraft according to the present invention may also include resilient couplings in the pylon mounting so as to obtain the desired stiffness.

What is claimed is:

1. In an aircraft or a spacecraft, the improvement which comprises the combination of a wing, a pylon, and a mass secured to said wing by the pylon in a manner such that an imaginary line between the centre of gravity of the mass and the region of the wing to which the pylon is attached is at an angle to a vertical plane extending longitudinally of the aircraft or spacecraft when the aircraft or spacecraft is in straight, horizontal flight, so that the mass and the pylon apply a force and a moment to the wing, wherein the moment is applied to the wing so as to alleviate a moment in the wing produced by lift on the wing, and wherein the force and the moment are applied to the wing through two or more attachment members, with at least one attachment member applying only one of the force and the moment.

2. An aircraft or spacecraft as claimed in claim 1, wherein said imaginary line is within the pylon.

3. In an aircraft or spacecraft, the improvement which comprises the combination of a wing, an L-shaped pylon, one side of which is located within the wing and is connected at its free end to a region of the wing, and the other side of which is substantially orthogonal to the wing, and a mass which is attached to the free end of said other side of the L-shaped pylon, wherein an imaginary line between the center of gravity of the mass and said region of the wing is at an angle to a vertical plane extending longitudinally of the aircraft or spacecraft when the aircraft or spacecraft is in straight, horizontal flight, so that the mass and the pylon apply a force and a moment to the wing, wherein the moment is applied to the wing so as to alleviate a moment in the wing produced by lift on the wing, and wherein the force and the moment are applied to the wing through two or more attachment members, with at least one attachment member applying only one of the force and the moment.

4. In an aircraft or spacecraft, the improvement which comprises the combination of a wing, a pylon, and a mass secured to said wing by the pylon in a manner such that an imaginary line between the center of gravity of the mass and the region of the wing to which the pylon is attached is at an angle to a vertical plane extending longitudinally of the aircraft when the aircraft is in straight, horizontal flight, so that a force and a moment are applied by the mass and the pylon to the wing, wherein the moment is applied to the wing so as to alleviate a moment in the wing produced by lift on the wing, wherein the force and the moment are applied to the wing through two or more attachment members, with at least one attachment member applying only one of the force and the moment, and wherein the pylon includes a connecting member which is rotatably mounted in one or more bearings which comprise first attachment members, and the pylon is secured to the wing by one or more second attachment members so that the force and the moment applied to the wing are applied through the bearings and the second attachment members respectively.

5. An aircraft or spacecraft as claimed in claim 4, wherein said connecting member is free to move axially in said bearings.

6. An aircraft or spacecraft as claimed in claim 5, wherein said connecting member is cylindrical.

7. An aircraft or spacecraft as claimed in claim 6, wherein said connecting member is a tube which is parallel to a chord of the wing.

8. An aircraft or spacecraft as claimed in claim 7, wherein the tube is mounted in two bearings and wherein there is one second attachment member which comprises one of said bearings which is secured to a spar, a lever arm secured to the tube and a pin attaching the free end of the lever arm to said spar.

9. An aircraft or spacecraft as claimed in claim 8, wherein the wing is a two spar wing and wherein the pin secures the free end of the lever arm to the rear spar.

10. An aircraft or spacecraft as claimed in claim 7, wherein the tube is rotatably mounted in one bearing and wherein there is a second tube, the first-mentioned tube being secured coaxially inside the second tube, which is of larger diameter than the first-mentioned tube and which comprises a first and a second attachment member, the ends of the second tube being secured to two spars.

11. An aircraft or spacecraft as claimed in claim 10, wherein the first-mentioned tube is secured to the centre of the second tube.

12. An aircraft or spacecraft as claimed in claim 10 wherein the wing is a three spar wing and wherein the second tube is secured to the middle and rear spars of the three spar wing.

13. An aircraft or spacecraft as claimed in claim 10, wherein the first-mentioned tube is located wholly or partly within the wing.

* * * * *